May 10, 1932. J. A. HEINEMANN 1,857,847
JOINTED BRACKET
Filed April 26, 1930
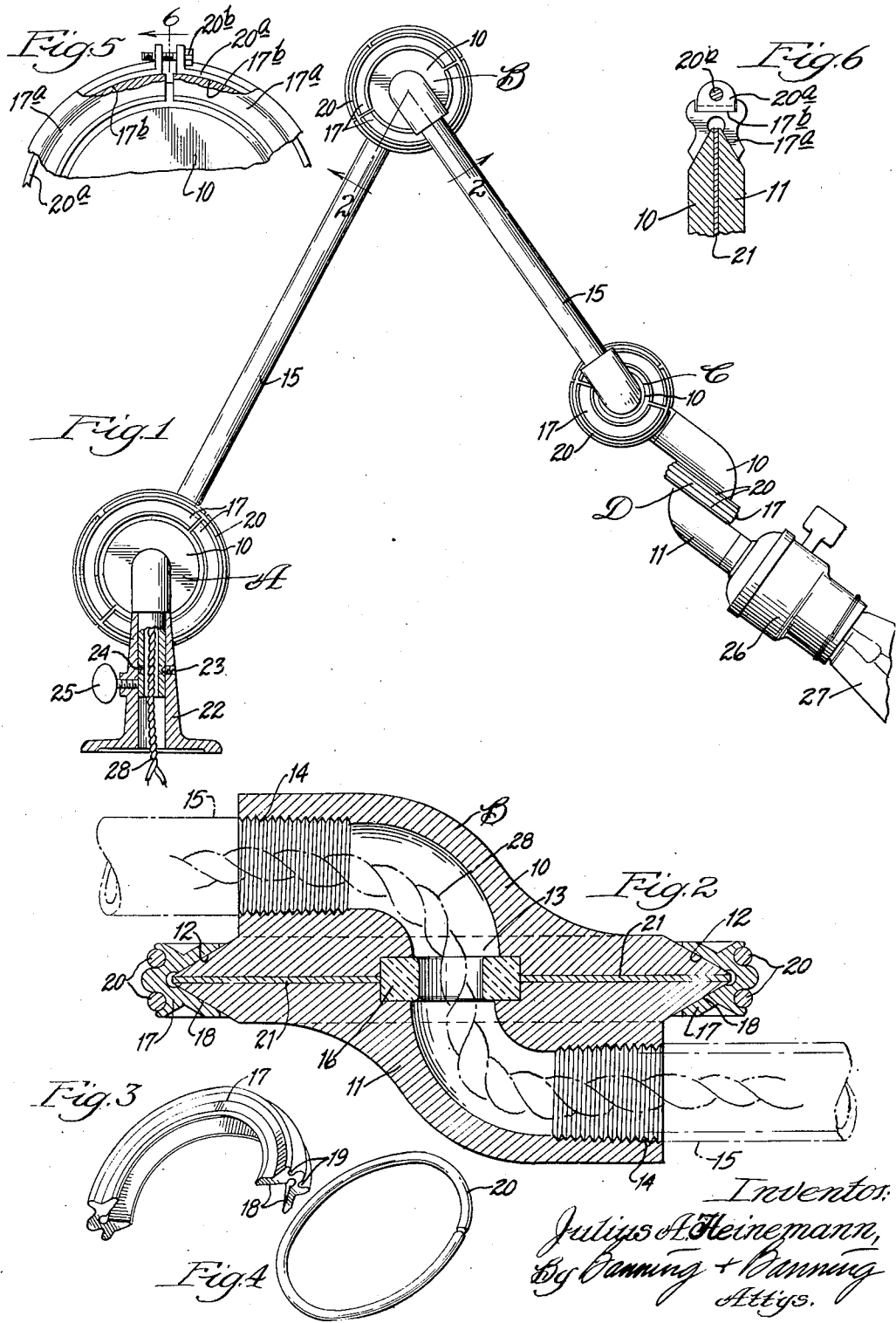

Patented May 10, 1932

1,857,847

UNITED STATES PATENT OFFICE

JULIUS A. HEINEMANN, OF CHICAGO, ILLINOIS

JOINTED BRACKET

Application filed April 26, 1930. Serial No. 447,493.

An object of this invention is to provide an improved flexible hollow joint for use on lamp brackets and the like which at the same time is substantially water-tight so as to protect lamp cords within the hollow bracket from water and oil.

Another object is to provide a water-tight flexible joint for use on a conduit for liquids, such as oil or water.
These and other objects, as will presently appear, are accomplished by this invention, which is fully described in the following specification and shown in the accompanying drawings, in which—
Figure 1 is a side elevation of an electric light bracket embodying the invention;

Fig. 2 is an enlarged sectional view on the broken line 2 of Fig. 1;

Fig. 3 is a perspective view of one of the friction members;

Fig. 4 is a perspective view of one of the snap rings by which the friction joint is yieldably held together;

Fig. 5 is a partial side elevation of a modified form of friction joint; and Fig. 6 is a transverse view of the same on the line 6 of Fig. 5.

The embodiment illustrated in Figs. 1 to 4 comprises essentially a joint made up of two preferably similar flanged members 10 and 11, which have a chamfered circular periphery 12 with a central opening 13 which is curved and terminates in a laterally extending opening 14, which is preferably threaded to receive a pipe 15. The two flanged members 10 and 11 are centered with respect to each other by means of a dowel ring bearing 16, which is located in registering seats in the members 10 and 11, and which is preferably made of compressed fibre, while the members 10 and 11 are made of any suitable metal.

Surrounding the chamfered peripheries 12 of the two flanged members 10 and 11 are two friction members or shoes 17 which have an annular groove 18 of substantially the same pitch as the chamfered peripheries 12. These two friction members 17 are provided with outside grooves 19 in which snap rings 20 are adapted to be placed. These snap rings are made of spring metal and yieldably hold the friction shoes 17 pressed inwardly against the chamfered peripheries 12 so as to provide friction between the friction members 17 and the members 10 and 11, and also to urge the members 10 and 11 toward each other so as to produce additional friction therebetween. A friction washer 21 is also provided between these two members so as to increase this friction. By varying the strength or tightness of the snap rings 20 any desired degree of friction may be obtained between the members 10 and 11 within quite a wide range.

To disassemble this flexible friction joint the two snap rings 20 are removed, after which the two friction members 17 may be withdrawn from the members 10 and 11, and then they may readily be separated. The whole may be reassembled by a reverse series of these operations.

In the lamp bracket shown, four of these friction joints, namely, A, B, C, and D, are provided, and these are connected by suitable piping 15 of any convenient length which is suitably attached to the jointed members, as shown in Fig. 2. In certain cases, as in the joints A and D, the connections are modified, as will readily be understood by anyone skilled in the art.

It will also be observed that while the joints A, B and C are preferably set to operate in the same plane, the joint D is set to operate in a plane at 90° from the others so as to give a more nearly universal joint effect to the whole. In addition, the joint A is rotatably mounted upon a suitable base 22, and is provided with a set screw 23 which enters a groove 24 so as to permit rotation of the bracket as a whole about the base 22, but which at the same time prevents it from being withdrawn therefrom. A set screw 25 may be added, if desired, which when screwed down prevents rotation of the bracket about the base. At the opposite end of the bracket is mounted any well known form of lamp socket 26 having an electric lamp 27 screwed therein, the lamp being supplied with electric current through two insulated electric light cords 28.

In Fig. 5 and 6 is shown a modified form of friction joint in which the members 10 and 11 with a friction washer 21 therebetween are made as before, and are held together by two friction members 17ª which, however, are provided with an outer cylindrical surface or groove 17ᵇ in which lies a metal band 20ª, which may be tightened by means of a screw 20ᵇ. In this way the friction may be varied at will by tightening or loosening the screw 20ᵇ.

Thus it will be seen that I have provided a very simple and efficient form of friction joint which has sufficient friction to maintain the bracket in any desired adjusted position, and which at the same time readily permits the parts to be flexed with respect to each other. This arrangement also provides for automatic compensation for wear, as well as adjustment for friction.

It will also be seen that this joint is watertight, and while it is used to enclose a lamp cord 28 and thus protect it from water, oil, or the like, from the outside, it also readily adapts itself for use as a conduit through which liquids may pass.

The device also can be used as a friction joint for supporting brackets of all kinds without being made hollow.

While I have shown and described but a few embodiments of my invention, it is to be understood that it is capable of many modifications. Changes, therefore, in the construction may be made which do not depart from the spirit and scope of the invention as disclosed in the appended claims.

I claim:

1. In a flexible joint, two flanged members lying face to face having meeting openings therethrough and having registering circular peripheries, a friction means overlapping said peripheries and urging said flanged members toward each other, and bearing means mounted in the openings within the members for retaining them against relative lateral movement.

2. In a flexible joint, two flanged members lying face to face having meeting openings therethrough and having registering circular chamfered peripheries, friction members overlapping said peripheries, yieldable members for urging said friction members toward said flanged members, and bearing means interposed between the faces of the flanged members to retain them against relative lateral movement.

3. In a flexible joint, two flanged members lying face to face having meeting openings therethrough and having registering circular oppositely chamfered peripheries, friction members overlapping said chamfered peripheries, spring means encircling said friction members for urging said friction toward said flanged members, and an annular bearing means interposed between the faces of the flanged members to retain them against relative lateral movement.

4. In a flexible joint, two hollow flanged members lying face to face and having registering circular oppositely chamfered peripheries, a liquid-tight friction washer between said flanged members, a centrally disposed dowel ring bearing freely mounted in said flanged members to retain them against relative lateral movement, and a split friction means overlapping said peripheries and yieldably urging said flanged members toward each other.

In testimony whereof, I have hereunto set my hand this 22 day of April, 1930.

JULIUS A. HEINEMANN.